US006890250B1

(12) United States Patent
Kim et al.

(10) Patent No.: US 6,890,250 B1
(45) Date of Patent: *May 10, 2005

(54) DIAMOND BLADE HAVING RIM TYPE CUTTING TIP FOR USE IN GRINDING OR CUTTING APPARATUS

(75) Inventors: Soo Kwang Kim, Irvine, CA (US); So Young Yoon, Seoul (KR)

(73) Assignee: EHWA Diamond Ind., Co., Ltd., Kyongki-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/786,307

(22) PCT Filed: Sep. 3, 1999

(86) PCT No.: PCT/KR99/00514

§ 371 (c)(1), (2), (4) Date: May 11, 2001

(87) PCT Pub. No.: WO00/13868

PCT Pub. Date: Mar. 16, 2000

(30) Foreign Application Priority Data

Sep. 3, 1998 (KR) .............................. 1998-36321

(51) Int. Cl.[7] .............................................. B23F 21/03

(52) U.S. Cl. ....................... 451/541; 451/542; 451/548

(58) Field of Search ............................... 125/12, 23.02, 125/20, 13.01; 83/495, 508.1, 864, 883, 541, 83/546, 547; 451/546, 541, 547

(56) References Cited

U.S. PATENT DOCUMENTS

| | | | | |
|---|---|---|---|---|
| 2,072,152 A * | 3/1937 | Blake et al. | ............ | 139/384 R |
| 2,097,803 A * | 11/1937 | Baalis | ........................ | 451/546 |
| 2,361,492 A | 10/1944 | Parc | | |
| 2,811,960 A | 11/1957 | Fessel | | |
| 3,048,160 A * | 8/1962 | Griffin et al. | ................. | 125/15 |
| 5,018,276 A * | 5/1991 | Asada | ......................... | 30/347 |
| 6,155,247 A * | 12/2000 | Akram et al. | | |
| 6,638,152 B1 * | 10/2003 | Kim et al. | .................. | 451/541 |

FOREIGN PATENT DOCUMENTS

| | | |
|---|---|---|
| DE | 2438601 | 2/1976 |
| GB | 1010318 | 11/1965 |

* cited by examiner

*Primary Examiner*—George Nguyen
(74) *Attorney, Agent, or Firm*—Vidas, Arrett & Steinkraus

(57) ABSTRACT

A diamond blade having rim type cutting tip for use in apparatus such as cutting saw machine having a structure which rim type cutting tip is able to produce cutting chips with relative large size during cutting operation so that those chips are easily discharged outside with reducing the friction with cutting tip of blade, thereby to increase cutting ability and to prevent the chips dispersing in the air and giving rise to the bad effects to user's health and the contamination of environment. The diamond blade according to the present invention comprises a wheel body connected with a shaft of electric motor, and rim type cutting tip for cutting or grinding crushable materials disposed on the circumference of the wheel body and composed of at least two diamond layers longitudinally disposed parallel with the rotation direction of the blade in which diamond particles are included, and non-diamond portion disposed between the diamond layers in which diamond particles are not included.

10 Claims, 10 Drawing Sheets

DIAMOND BLADE HAVING RIM TYPE CUTTING TIP FOR USE IN GRINDING OR CUTTING APPARATUS

BACKGROUND OF THE INVENTION

The present invention relates to a diamond blade for an apparatus such as a cutting saw machine for grinding or cutting workpieces such as brick, concrete, granite, marble, etc., and more particularly to a diamond blade having a rim type cutting tip in which at least two diamond layers are longitudinally disposed along the rotation direction of the diamond blade to form microscopic linear cutting grooves to cause portions of the workpieces between the cutting grooves to be crushed in chips of relatively large size by non-diamond portion of the rim type cutting tip during the cutting operation, and thereby to enhance cutting rate of the diamond blade and to prevent the crushed chips from dispersing easily in the air and from causing bad affects to user's health and the contamination of environment.

FIG. 1 is a front view of one conventional diamond blade for a cutting saw machine for grinding or cutting workpieces in which diamond particles are randomly distributed on a rim type cutting tip thereof, the conventional diamond blade 1 comprises a steel wheel body 2 whose center hole is connected with a shaft of electric motor, and a rim type cutting tip 3 disposed circumferentially and fixedly on the steel wheel body 2. Here, the rim type cutting tip 3 is fabricated by mixing abrasive materials such as diamond and metal powders composing of cobalt, nickel, bronze, copper, etc., or particles of resin or ceramic, and then forming a rim of predetermined shape from the mixed particles.

Especially, the diamond particles 4 are randomly distributed in the inside and on the surfaces of the rim type cutting tip 3 as shown in FIG. 3.

In the diamond blade 1, as shown in FIG. 3, both outer surfaces of the rim type cutting tip 3 contacts with corresponding surface portion of workpiece 18, and grinds it to form a cutting slot 16 in workpiece 18 during the cutting operation.

Minute chips produced during the cutting operation of the rim type cutting tip 3 are gathered in the cutting slot 16 and then discharged from there outside by the rotation of the rim type cutting tip 3.

However, since both surfaces of the rim type cutting tip 3 of the diamond blade 1 has the same shape and the same material composition on the whole, both edges 15 of the rim type cutting tip 3 contacting with the side walls and bottom of the cutting slot 16 are defaced faster than the center 17 of the rim type cutting tip 3 contacting only with the bottom of the cutting slot 16.

Accordingly, the contacting area between the upper surface of the rim type cutting tip 3 and the workpiece 18 is enlarged to increase resistance of the workpieces 18, and thereby causing poor cutting and decreasing cutting rate and the life of the diamond blade 1.

Further, since the size of chips produced during the cutting operation is are relatively very minute, these chips remains in the cutting slot 16 and prevents the upper surface of the rim type cutting tip 3 from grinding the bottom of the cutting slot 16, and thereby decreasing cutting rate. Also, if those minute chips discharged from the cutting slot 16 are dispersed in the air, it causes the bad affects to user's health and the contamination of environment.

To improve these problems, there has been proposed a diamond blade 11, as shown in FIG. 2.

FIG. 2 is a front view of the other conventional diamond blade in which diamond particles are randomly distributed in rim type cutting tip thereof and a plurality of depressed portions are disposed in both outer surfaces of the rim type cutting tip thereof. Namely, the conventional diamond blade 11 has a plurality of depressed portions 19 formed with a predetermined interval in both surfaces of a rim type cutting tip 13. Here, the rim type cutting tip 13 is disposed circumferentially and fixedly on a steel wheel body 12 and has a plurality of diamond particles 14 on its surfaces.

However, even though the diamond blade 11 is improved tip to be defaced during the cutting operation as the minute chips are effectively discharged from the cutting slot, it has still the disadvantages to deface both edges of upper surface to induce poor cutting, to decrease its own cutting rate and life of blade, to produce very minute chips to decrease its own cutting rate, and to disperse the produced minute chips in the air, which cause the bad affects to user's health and the contamination of environment.

SUMMARY OF THE INVENTION

It is a main object of the present invention to provide a diamond blade for cutting or grinding workpieces such as brick, concrete, granite, marble, etc., having a rim type cutting tip in which at least two diamond layers are longitudinally disposed along the rotation direction of the diamond blade to form microscopic cutting grooves in the workpieces during the cutting operation, and thereby to cause portion of workpieces between the microscopic cutting grooves to be easily crushed by non-diamond portion of the rim type cutting tip to enhance cutting rate of the diamond blade.

It is another object of the present invention to provide a diamond blade for an apparatus such as cutting saw machine having a structure which a rim type cutting tip is able to produce cutting chips of a relatively large size during the cutting operation so that those chips are easily discharged from the cutting slots outside with reducing the friction with the rim type cutting tip of the diamond blade, thereby to increase cutting rate and to prevent those chips from dispersing in the air and rise to from causing a bad affects to user's health and the contamination of environment.

It is the other object of the present invention to provide a diamond blade for use in an apparatus such as a cutting saw machine having a rim type cutting tip which diamond particles in diamond layer thereof are distributed in a given pattern to reduce the amount of diamond particles used and thereby reducing the manufacturing cost of the diamond blade.

To accomplish these objects, a diamond blade for grinding or cutting workpieces according to the present invention comprises a wheel body connected with a shaft of an electric motor, and a rim type cutting tip for grinding or cutting workpieces disposed on the circumference of the wheel body, and composed of at least two diamond layers longitudinally disposed parallel with the rotation direction of the diamond blade in which diamond particles are included, and a non-diamond portion disposed between the diamond layers in which the diamond particles are not included.

In this embodiment of the present invention, the diamond layers are disposed each other at predetermined intervals perpendicular to the rotation direction of the diamond blade.

It is desirable that the diamond layers are disposed only on both surfaces of the rim type cutting tip.

Alternatively, the diamond particles in each diamond layer of the rim type cutting tip are distributed in a predetermined pattern or arrangement such a single or double layer figure with grid shaped spots.

Also, in the non-diamond portion of the rim type cutting tip, the diamond particles can be distributed in the density lower than that of the diamond layers.

In the other embodiment of the present invention, a diamond blade for for grinding or cutting workpieces comprises a wheel body connected with a shaft of an electric motor, and a rim type cutting tip for grinding or cutting workpieces, which is disposed on the circumference of the wheel body and composed of a non-diamond portion having a plurality of depressed portions disposed at predetermined intervals to cross each other in both surfaces of the non-diamond portion, and a plurality of diamond layers longitudinally disposed parallel with the rotation direction of the diamond blade respectively on bottom surfaces of the depressed portions of the non-diamond portion and both surfaces of the non-diamond portion divided by depressed portions thereof.

In this embodiment of the present invention, it is desirable that the bottom surfaces of the depressed portions of the non-diamond portion are positioned in the plane forming the center between both surfaces of non-diamond portion to let the diamond layers disposed thereon to form one cutting line during the cutting operation of the diamond blade.

Also, a depth of all bottom surfaces of the depressed portions of both surfaces of the non-diamond portion can be set up to be less than a half of the thickness of the non-diamond portion to let the diamond layers disposed thereon to form at least two linear cutting line during the cutting operation of the diamond blade.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENTS

In several embodiments of this invention described below with reference to the accompanying drawings, the invention is applied to cutting saw machine.

Figure 1:
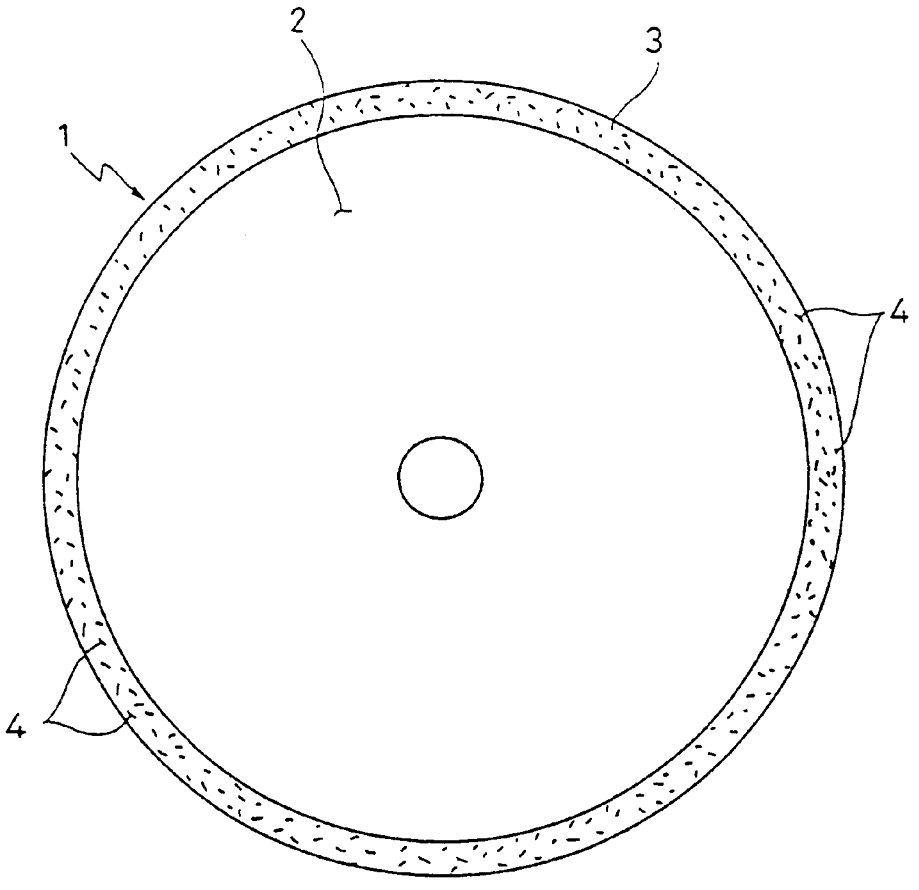
FIG. 1 (PRIOR ART)
FIG. 1 is a front view of one conventional diamond blade for a cutting saw machine in which diamond particles are randomly distributed in a rim type cutting tip thereof.
Figure 2:
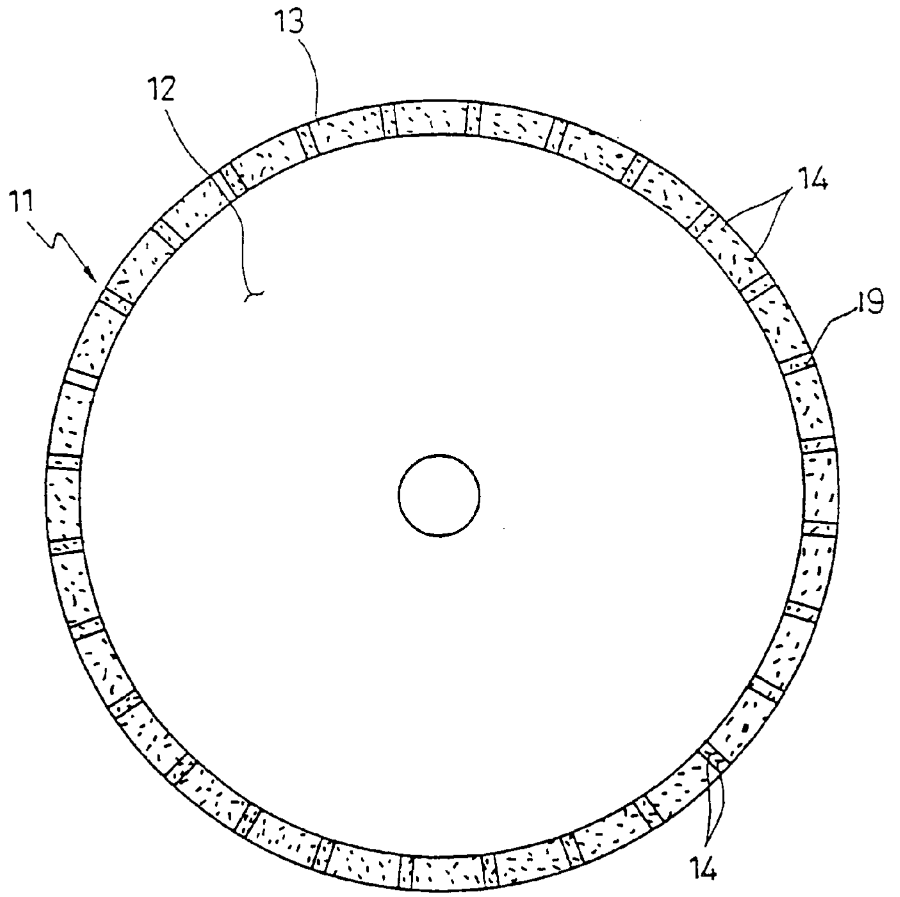
FIG. 2 (PRIOR ART)
FIG. 2 is a front view of the other conventional diamond blade in which diamond particles are randomly distributed in a rim type cutting tip thereof and a plurality of depressed portions are disposed in both surfaces of the rim type cutting tip thereof.
Figure 3:
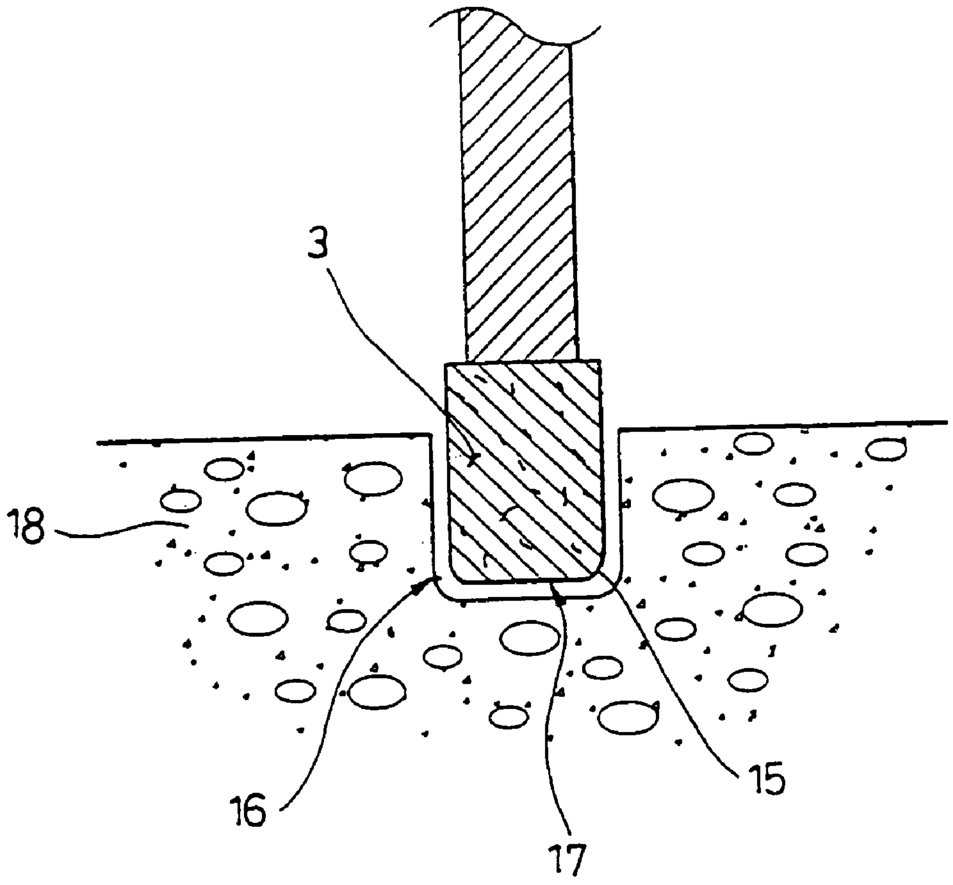
FIG.3 (PRIOR ART)
FIG. 3 is a partial cross-sectional view of the conventional diamond blade shown in FIG. 1 to illustrate state in which the rim type cutting tip thereof is operated.
Figure 4:
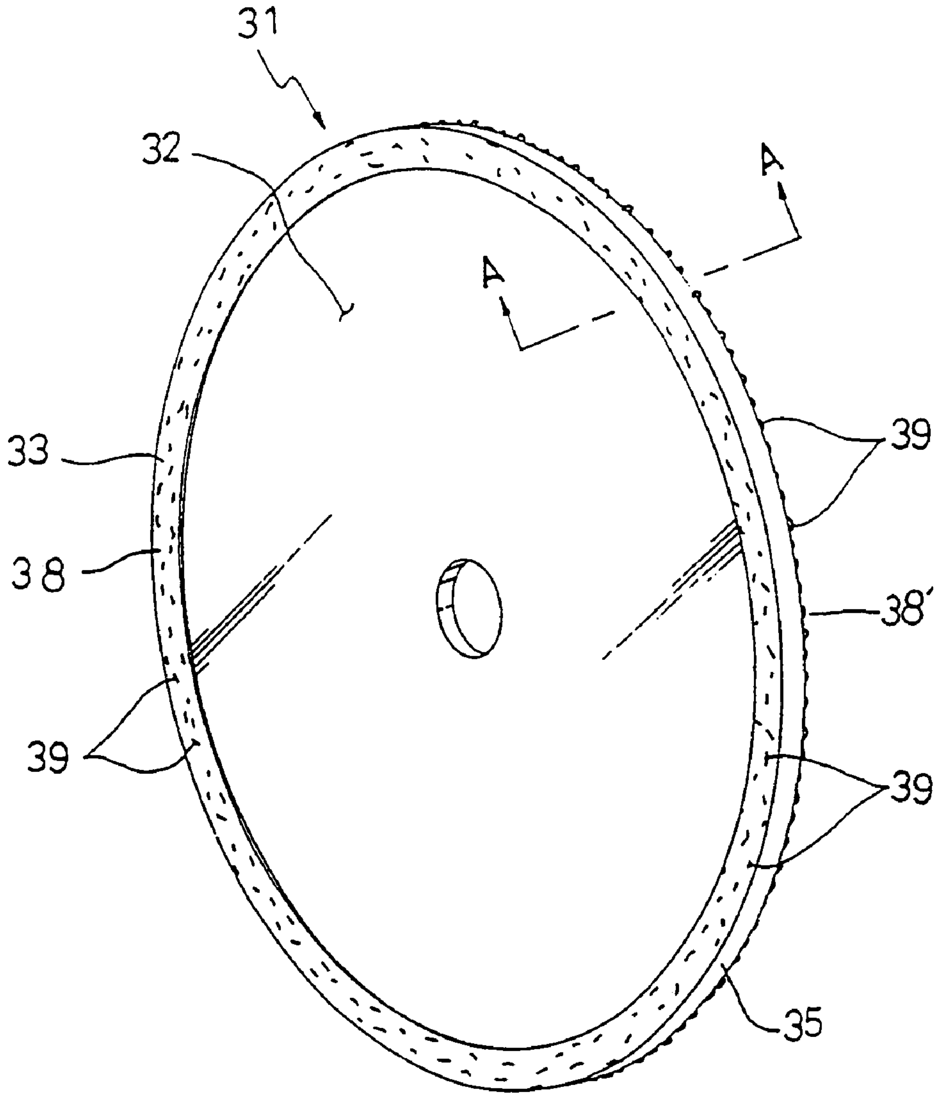
FIG. 4 is a perspective view of a diamond blade for cutting saw machine according to one preferred embodiment of the present invention, which two diamond layers are longitudinally disposed respectively in both surfaces of non-diamond portion of the rim type cutting tip to form two microscopic linear cutting grooves in the workpieces during the cutting operation.

FIG. 4 is a perspective view of a diamond blade for cutting saw machine according to one preferred embodiment of the present invention which two diamond layers are longitudinally disposed respectively in both surfaces of non-diamond portion of the rim type cutting tip to form two microscopic linear cutting grooves in the workpieces during the cutting operation.

As shown in the FIG. 4, the diamond blade 31 for the cutting saw machine comprises a wheel body 32 connected with a shaft of an electric motor, and a rim type cutting tip 33 circumferentially fixed on the wheel body 32 for cutting or grinding workpiece.

Figure 5:
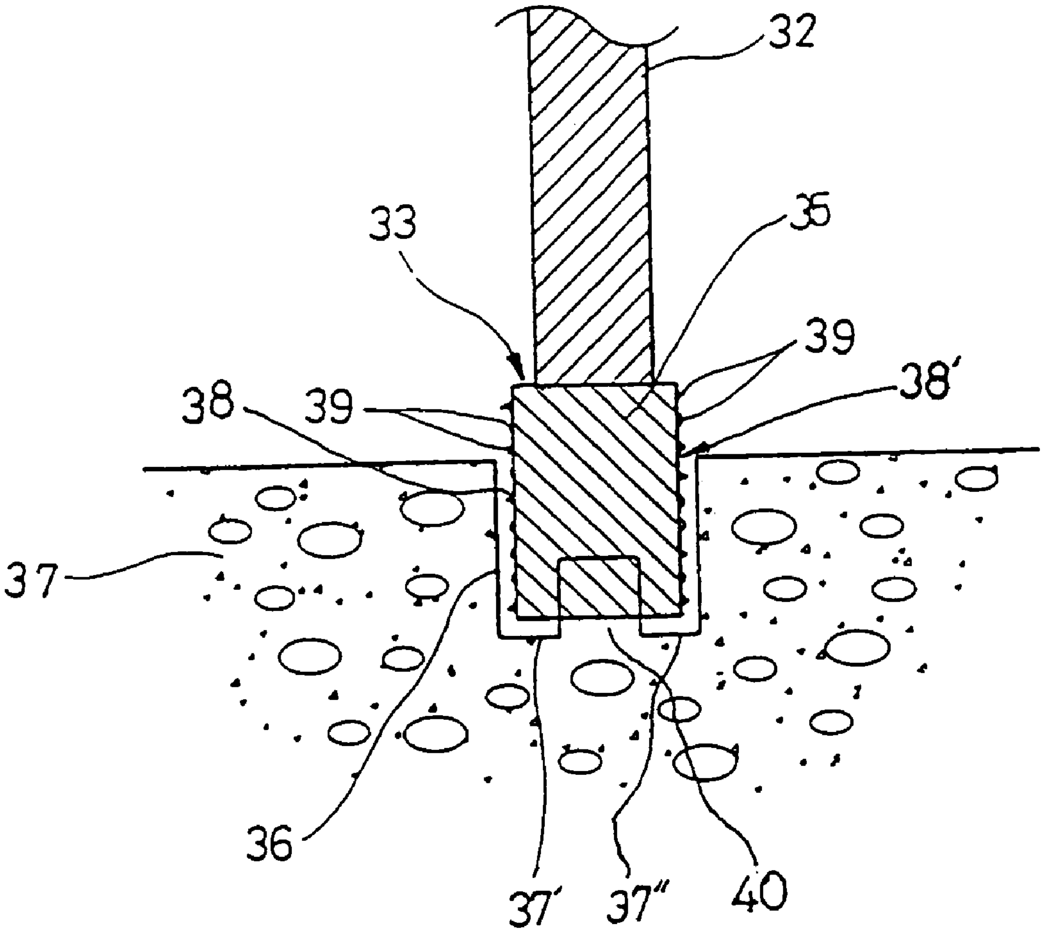
FIG. 5 is a partial cross-sectional view of the diamond blade of the present invention taken along life AA of FIG. 4 to illustrate state which the rim type diamond cutting tip is operated.

Here, the rim type cutting tip 33 comprises two thin diamond layers 38 and 38' longitudinally disposed respectively on both surfaces thereof parallel with the rotation direction of the diamond blade 31, and a non-diamond portion 35 disposed between two diamond layers 38 and 38', as shown in FIGS. 4 and 5.

FIG. 5 is a partial cross-sectional view of the diamond blade of the present invention taken along line AA of FIG. 4 to illustrate state which the rim type diamond cutting tip 33 is operated.

As shown in the FIG. 5, the thin diamond layers 38 and 38' are composed of particles 39 made of abrasive materials such as diamond, metal powders composing of cobalt, nickel, bronze, copper, etc., or particles of resin or ceramic.

Especially, particles 39 of diamond in thin diamond layers 38 and 38' are randomly distributed, or in a predetermined pattern or arrangement such a single or double layer figure with grid shaped spots to reduce a amount of distributed diamond particles.

The non-diamond portion 35 can be further composed of abrasive materials such as diamond, and metal powders such as cobalt, nickel, bronze, copper, etc., or resin or ceramic.

The thin diamond layers 38 and 38' function to prevent edge area of both surfaces of the rim type cutting tip 33 from defacing, and to form two microscopic linear cutting grooves 37' and 37" in the workpiece 37 during the cutting operation, as shown in FIG. 5. Thus, a portion 40 of the workpiece 37 between two cutting grooves 37' and 37" can be easily crushed by small frictional and/or rotation impact force of the non-diamond portion 35 and thereby the non-diamond portion 35 of the rim type cutting tip 33 is able to produce cutting chips with a relatively large size during cutting operation. Here, those chips are easily discharged from a cutting slot 36 outside with reducing the friction with the rim type cutting tip 33, thereby the diamond blade increases cutting rate and prevent the crushed chips from dispersing in the air.

Figure 7:
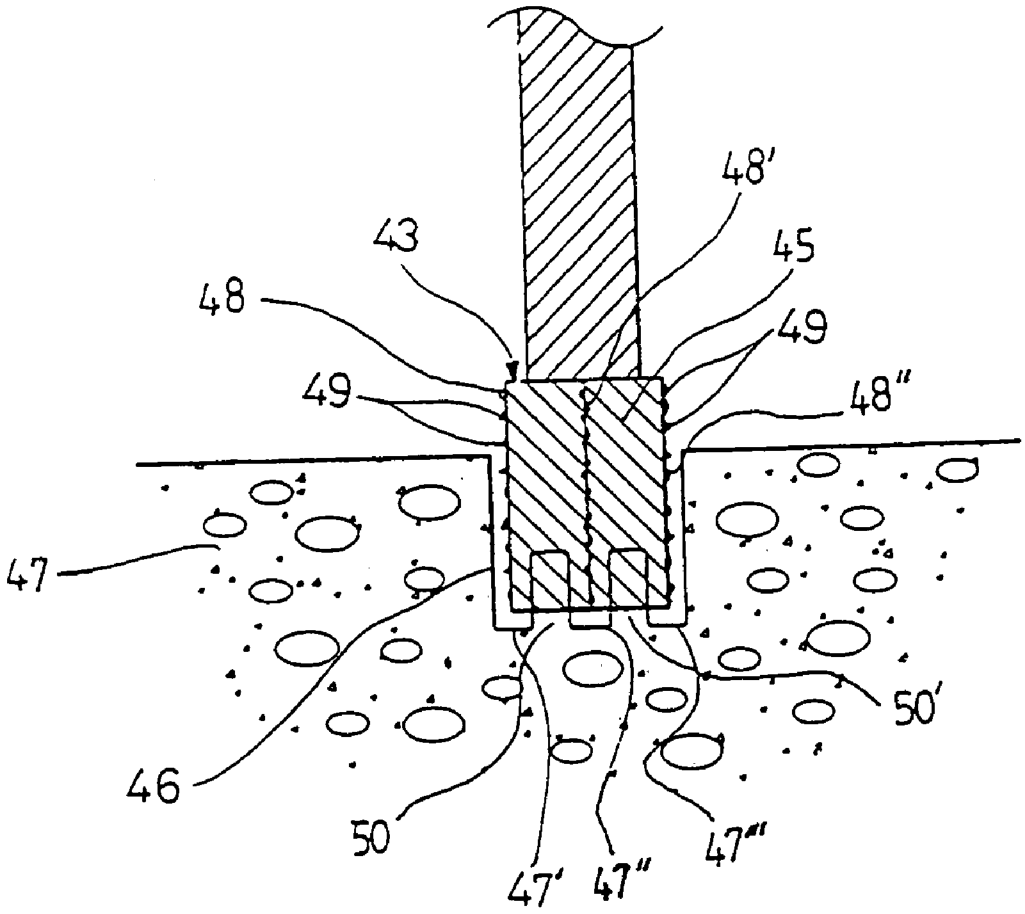
FIG. 7 is a partial cross-sectional view of the diamond blade of the present invention overlapping cross-sections taken along lines B—B and C—C of FIG. 6 to illustrate state which the rim type diamond cutting tip is operated.
Figure 8:
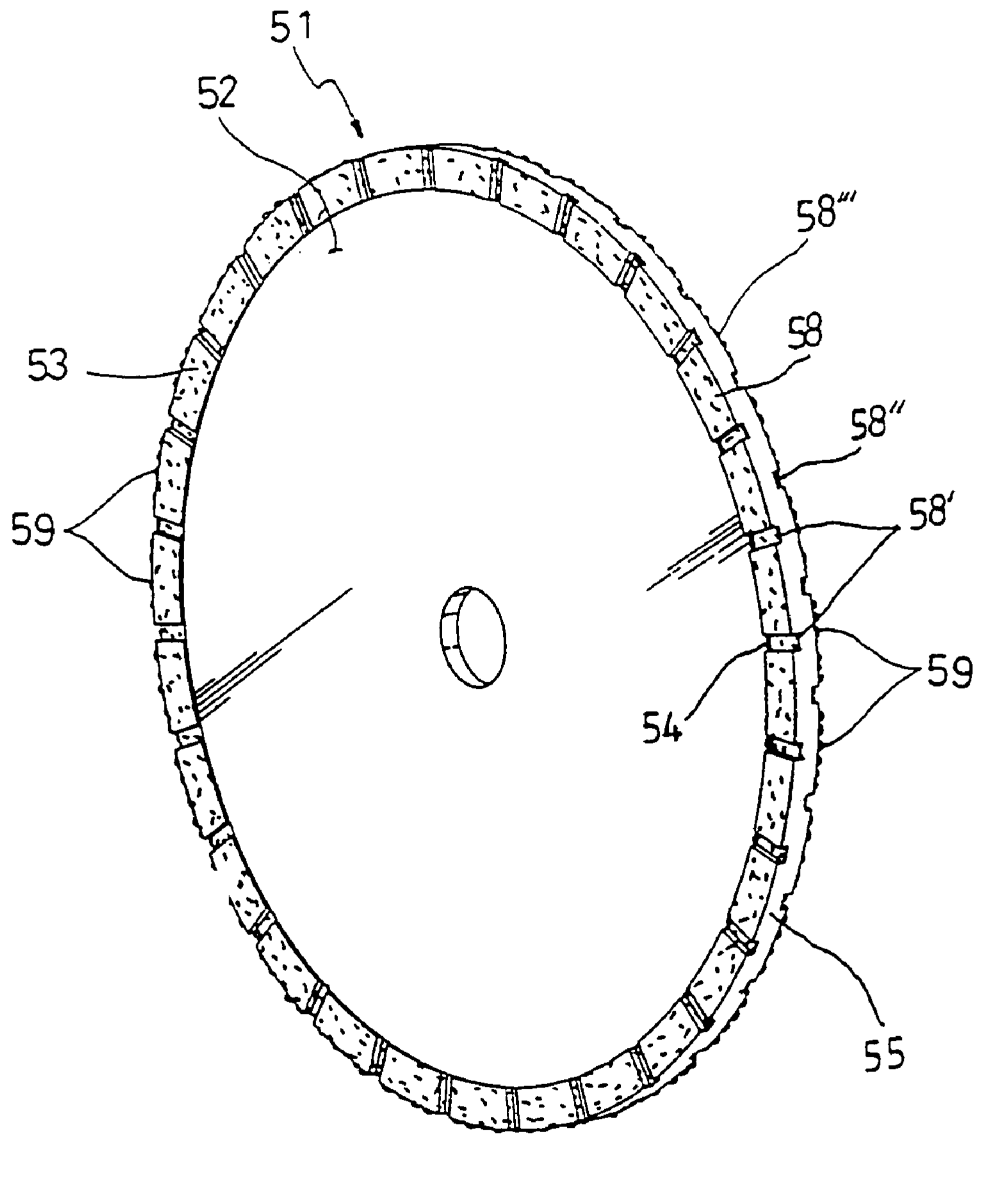
FIG. 8 is a perspective view of the diamond blade of the present invention which the depth of bottom surfaces of depressed portions of the non-diamond portion is less than a half of the entire thickness of the non-diamond portion.
Figure 9:
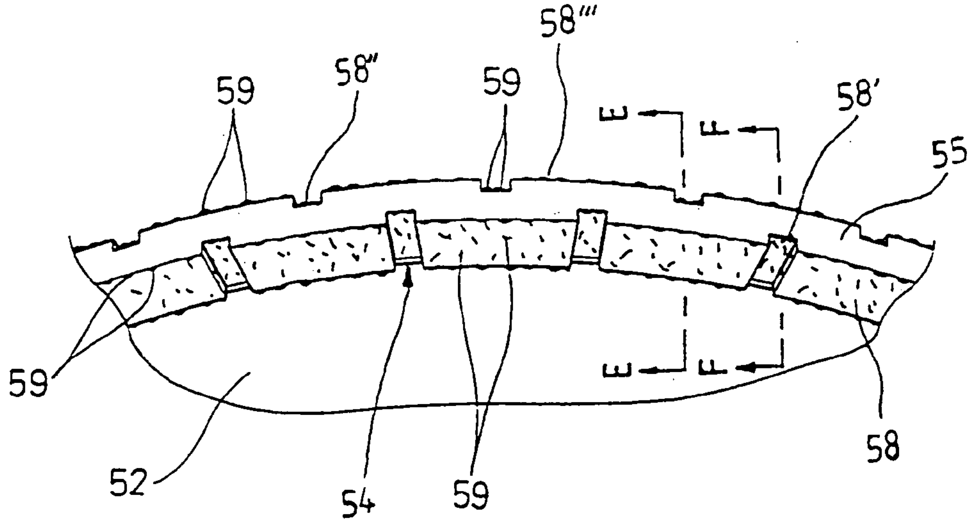
FIG. 9 is a partial perspective view of the diamond blade of the present invention shown in FIG. 8.
Figure 10:
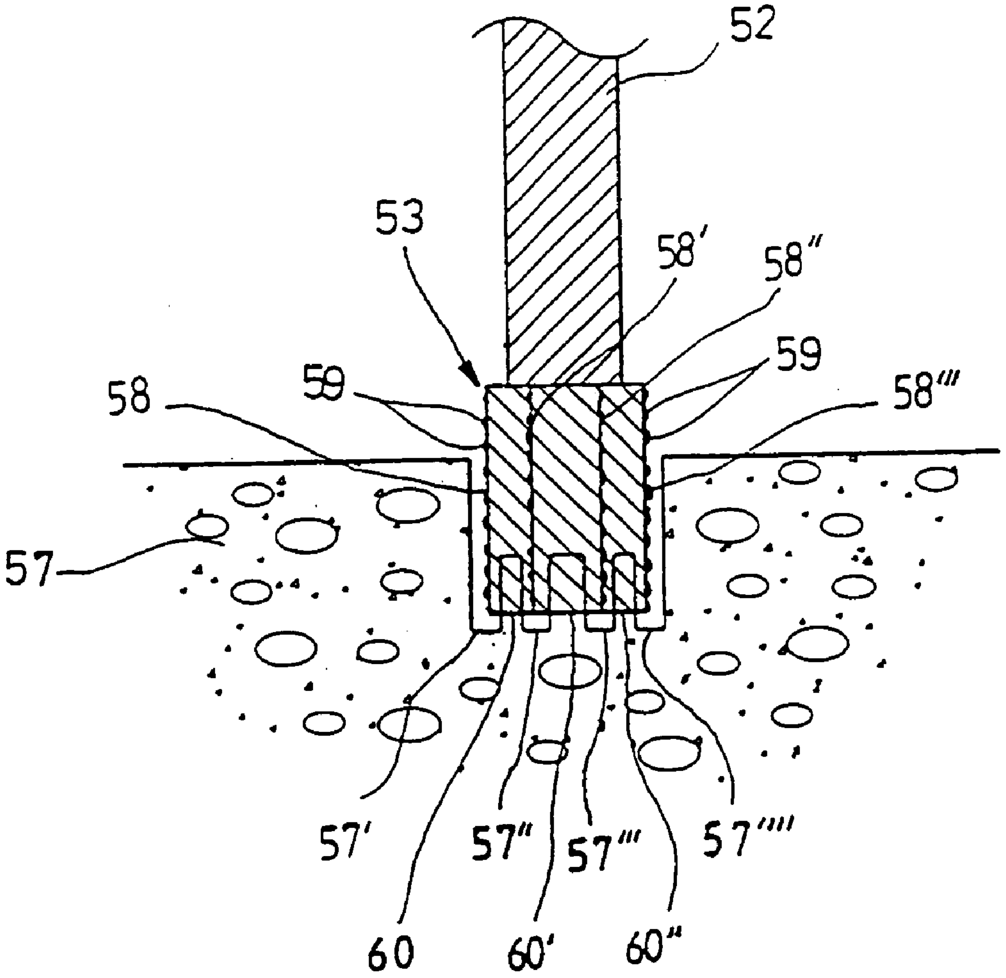
FIG. 10 is a partial cross-sectional view of the diamond blade of the present invention overlapping cross-sections taken along lines EE and FF of FIG. 9 to illustrate state which the rim type cutting tip is operated.

In this embodiment of the present invention, it is noted that the rim type cutting tip 33 can be substituted by another rim type cutting tip composed of three or four thin diamond layers longitudinally disposed therein parallel with the rotation direction of the diamond blade respectively to form three or four microscopic linear cutting grooves in the workpiece during the cutting operation, and non-diamond portions disposed between the three or four diamond layers, as shown in FIGS. 7 and 10.

The diamond layers are each other disposed at predetermined intervals perpendicular to the rotation direction of the diamond blade between the non-diamond portions of the rim type cutting tip.

In this case, a portion of workpiece between the microscopic linear cutting grooves can be easily crushed by a friction and rotation impact force smaller than that of the non-diamond portion 35 of the rim type cutting tip 33 having the two thin diamond layers 38 and 38' as shown in FIG. 5.

Also, the density of the diamond particles 39 distributed in the diamond layers 38 and 38' of the rim type cutting tip 33 is relatively larger than that of the non-diamond portion 35 of the rim type cutting tip 33.

Figure 6:
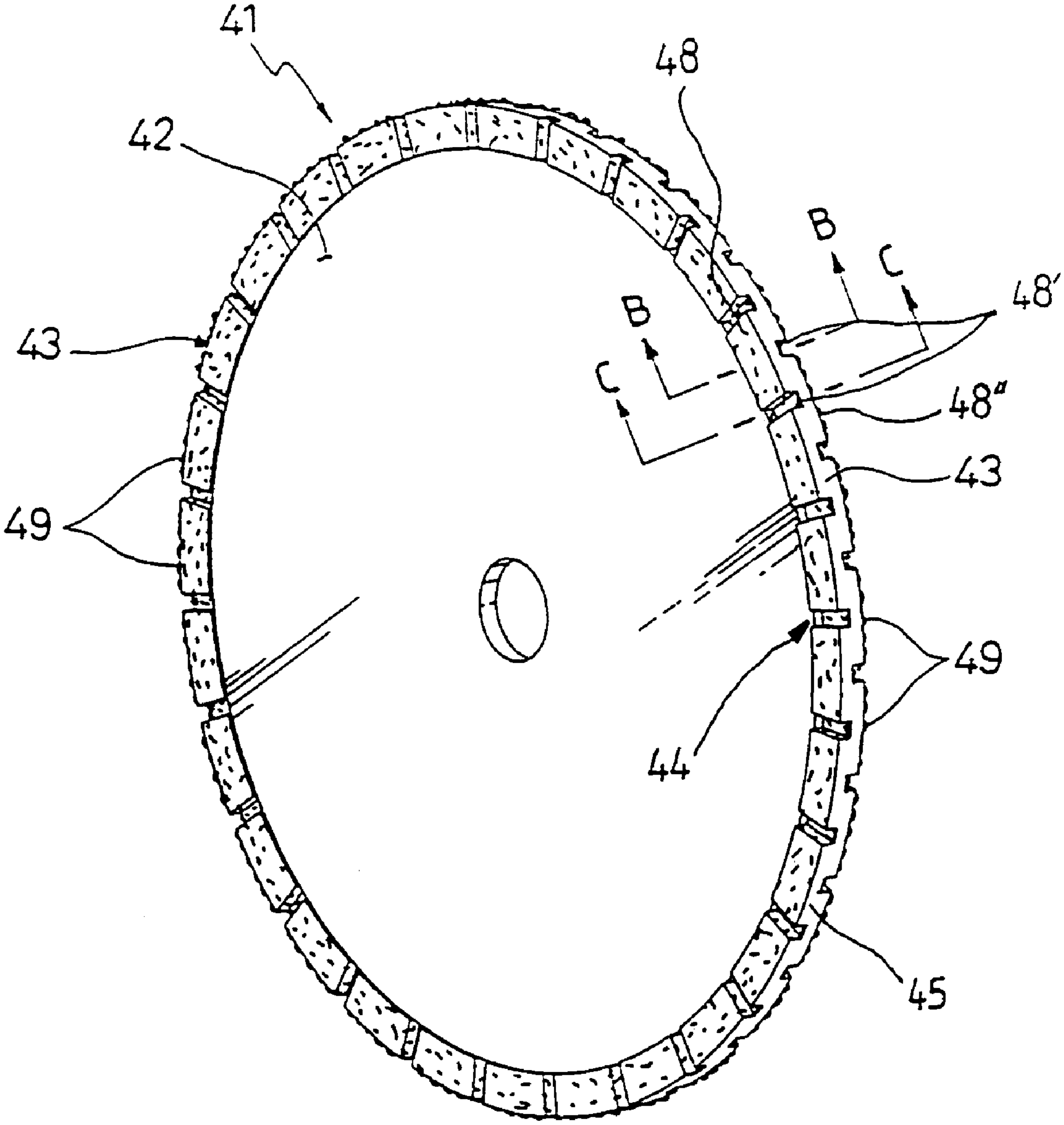
FIG. 6 is a perspective view of a diamond blade for cutting saw machine according to the other embodiment of the present invention in which a plurality of diamond layers are longitudinally disposed respectively on bottom surfaces of depressed portions of non-diamond portion, and both surfaces of non-diamond portion and the depth of bottom surfaces of depressed portions of the non-diamond portion is a half of the entire thickness of the non-diamond portion.

FIG. 6 is a perspective view of a diamond blade for cutting saw machine according to the other embodiment of the present invention in which a plurality of diamond layers are longitudinally disposed respectively on bottom surfaces of depressed portions of non-diamond portion and both surfaces of the non-diamond portion and the depth of bottom surfaces of depressed portions of the non-diamond portion is a half of the entire thickness of the non-diamond portion; and FIG. 7 is a partial cross-sectional view of the diamond blade of the present invention overlapping cross-sections taken along lines BB and CC of FIG. 6 to illustrate state which the rim type diamond cutting tip is operated. As shown in FIGS. 6 and 7, the diamond blade 41 for cutting saw machine comprises a wheel body 42 connected with a shaft of an electric motor, and a rim type cutting tip 43 disposed fixedly on the circumference of the wheel body 42.

Here, the rim type cutting tip 43 comprises a non-diamond portion 45 having a plurality of depressed portions 44 disposed at predetermined intervals to cross each other in inner and outer surfaces of the non-diamond portion 45, a plurality of diamond layers 48, 48', and 48" longitudinally disposed parallel with the rotation direction of the diamond blade 41 respectively on the bottom surfaces of the depressed portions 44 of the non-diamond portion 45, and both divided surfaces of the non-diamond portion 45 divided by the depressed portions 44.

Bottom surfaces of the depressed portions 44 of the non-diamond portion 45 are positioned on the plane forming the center between both surfaces of the non-diamond portions 45 to let the diamond layers 48' disposed thereon to form one microscopic linear cutting groove 47" in the workpiece 47 during the cutting operation of the diamond blade 41, as shown in FIG. 7.

Thus, the diamond layers 48, 48', and 48" on the bottom surfaces of the depressed portions 44 of the non-diamond portion 45, and the inner and outer surfaces of the non-diamond portion 45 form the three microscopic linear cutting grooves 47', 47", 47'" in the workpiece 47 to let the protruded portions 50 and 50' of the workpiece 47 between the microscopic linear cutting grooves 47, 47', and 47" to be easily crushed by a small friction and rotation impact force of the non-diamond portion 45 during the cutting operation of the diamond blade 41, as shown in FIG. 7.

Also, the density of the diamond particles distributed in the diamond layers 48, 48' and 48" is relatively larger than that of the non-diamond portion 45 of the rim type cutting tip 33.

Alternatively, in this embodiment of the present invention, the depth of bottom surfaces of the depressed portions 54 in the non-diamond portion 55 can be less than a half of the entire thickness of the non-diamond portion 55 to let the diamond layers 58' and 58" disposed thereon to form the two microscopic linear cutting grooves 57" and 57'" in the workpiece 57 during the cutting operation of the diamond blade 51, as shown in FIG. 10.

Thus, in this case, the diamond layers 58, 58', 58", and 58'" on both surfaces of the non-diamond portion 55 and the bottom surfaces of depressed portions 54 thereof form four microscopic linear cutting grooves 57', 57", 57'" and 57"" in the workpiece 57 to let protruded portions 60, 60' and 60" of the workpiece 57 between the cutting grooves 57', 57", 57" and 57"" to be easily crushed by a small friction and rotation impact force of the non-diamond portions 55 during the cutting operation of the diamond blade 51, as shown in FIG. 10.

The operation of the diamond blades having the rim type cutting tip for an apparatus such as a cutting saw machine according to the embodiments of the present invention will de described, hereinafter.

As shown in FIG. 4 when the wheel body 32 connected to the shaft of electric motor is rotated by the operation of the electric motor, the rim type cutting tip 33 begins to cut or grind workpieces 37 such as brick, concrete, granite, marble, etc., and then a cutting slot 36 is generated in the workpiece 37 along a predetermined line.

At this time, since the thin diamond layers 38 and 38' including the particles 39 of diamond disposed in both surfaces of the rim type cutting tip 33, both the edges of the rim type cutting tip 33 are defaced less than the center of the diamond blade and thereby the two microscopic linear cutting grooves 37' and 37" are formed in the cutting slot 36 in the workpiece 37, as shown in FIG. 5.

By forming the cutting grooves 37' and 37", the protrude portion 40 of the workpiece 37 therebetween is weakened and easily crushed by a small friction and rotation impact force of the non-diamond portion 35. Thus, the non-diamond portion 35 of the rim type cutting tip 33 is able to produce cutting chips with relatively large size, and the produced chips are easily discharged from the cutting slots 36 outside with reducing the friction between the rim type cutting tip 33 and the workpiece, thereby the diamond blade 31 increases cutting rate and prevents the produced chips from dispersing in the air.

Therefore, by repeating the operation of the rim type cutting tip 33 of the diamond blade 31, the workpiece 37 along the predetermined line thereon is cut or ground.

Similarly, as shown in FIGS. 7 and 10, the operation of these diamond blades 41 and 51 is the same that of the diamond blade 31 of embodiment noted above expect that the diamond layers 48, 48", and 48", or 58, 58', 58", 58'", and 58"" on both surfaces of the non-diamond portion 45 or 55 and bottom surfaces of depressed portions 44 or 54 form the three or four linear cutting grooves 47', 47", and 47'", or 57', 57", 57'", and 57"" in the workpieces 47 or 57.

As apparent from the foregoing description, it can be appreciated that the present invention provides a diamond blade having a rim type cutting tip which at least two diamond layers are longitudinally disposed along the rotation direction of the diamond blade to form at least two microscopic linear cutting grooves in the workpieces during the cutting operation, and thereby they form the protrude portions of workpieces between the cutting grooves to be easily crushed by the non-diamond portions of the rim type cutting tip and enhance cutting rate of the diamond blade.

Also, the present invention provides a diamond blade having a structure which the rim type cutting tips are able to produce cutting chips with relatively large size during the cutting operation, so that those chips are easily discharged from the cutting slot outside with reducing the friction between the rim type cutting tip and the workpiece, thereby they increase cutting rate and prevent the crushed chips from dispersing in the air and from causing the bad affects to user's health and the contamination of environment.

Also, the present invention provides a diamond blade having a rim type cutting tip which diamond particles in diamond layer thereof are distributed in a predetermined pattern to reduce a amount of distributed diamond particles and thereby reducing the manufacturing cost of the diamond blade.

What is claimed is:

1. A diamond blade (31) for grinding or cutting workpieces, comprising:

a wheel body (32); and an annular rim type cutting tip (33) having a uniform rectangular-shaped cross-section, which is fixed to a periphery of said wheel body (32), said rim type cutting tip including:

two diamond layers (38, 38') including diamond particles (39), which are longitudinally disposed parallel with rotation direction of said wheel body (32); and a non-diamond portion (35) disposed between said two diamond layers (38, 38'), in which said non-diamond portion (35) does not include the diamond particles (39);

whereby said two diamond layers (38,38') form microscopic cutting grooves (37, 37') within the workpieces (37) during grinding or cutting operation and said non-diamond portion (35) crushes portion (40) of the workpieces (37) between the microscopic cutting grooves (37', 37") into a relatively larger size as said non-diamond portion (35) applies a relatively small friction and a rotation impact to the portion (40).

2. The diamond blade as claimed in claim 1, wherein the diamond particles (39) in each diamond layer of the rim type cutting tip are formed in a predetermined pattern of grid.

3. The diamond blades as claimed in claim 1, wherein said diamond particles in each diamond layer of the rim type cutting tip are randomly distributed.

4. The diamond blade of claim 1 wherein said non-diamond portion further having a plurality of depressed portions, the depressed portions being disposed at predetermined intervals to cross each other on the inner and outer surfaces of the non-diamond portion; and a plurality of diamond layers longitudinally disposed parallel with the rotation direction of the diamond blade respectively on depressed bottom surfaces of the depressed portions, and on the inner and outer surfaces of the non-diamond portion divided by the depressed portions of the non-diamond portion, wherein the depressed bottom surfaces and the inner and outer surfaces are parallel to the rotation direction of the diamond blade.

5. The, diamond blade as claimed in claim 4, wherein the bottom surfaces of the depressed portions of the non-diamond portion are positioned in a plane between the inner and outer surfaces of the non-diamond portion.

6. The diamond blade as claimed in claim 4, wherein the depth of the depressed bottom surfaces of the depressed portions surfaces of the non-diamond portion is less than a half of the thickness of the non-diamond portion.

7. The diamond blade as claimed in claim 4, wherein the diamond particles in each diamond layer of the rim type cutting tip are distributed in a predetermined pattern or arrangement.

8. The diamond blade as claimed in claim 7, wherein the diamond particles in each diamond layer of the rim type cutting tip are distributed in a single layer with grid shaped spots.

9. The diamond blade as claimed in claim 7, wherein the diamond particles in each diamond layer of the rim type cutting tip are distributed in a double layer with grid shaped spots.

10. The diamond blade as claimed in claim 4, wherein the diamond particles in each diamond layer of the rim type cutting tip are randomly distributed.

* * * * *